(12) United States Patent
Srinivasan et al.

(10) Patent No.: US 12,470,457 B1
(45) Date of Patent: Nov. 11, 2025

(54) ENABLING ONLINE INSERTION AND REMOVAL OF A PHYSICAL INTERFACE MODULE OF A LINE CARD OF A NETWORK DEVICE

(71) Applicant: Juniper Networks, Inc., Sunnyvale, CA (US)

(72) Inventors: Eswaran Srinivasan, Fremont, CA (US); Vineet Sharma, Mullanpur (IN); Sandip Kumar Ghosh, Bangalore (IN); Venkata Durga Pradeep Kumar Kasula, Bangalore (IN); Swamy Sadashivaiah Renu Kananda, Tracy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 60 days.

(21) Appl. No.: 18/324,699

(22) Filed: May 26, 2023

(51) Int. Cl.
*H04L 41/0803* (2022.01)

(52) U.S. Cl.
CPC ................................ *H04L 41/0803* (2013.01)

(58) Field of Classification Search
CPC ..... H04L 41/0813; H04L 45/60; H04L 41/08; H04L 41/0803
See application file for complete search history.

(56) References Cited

U.S. PATENT DOCUMENTS

| | | | | |
|---|---|---|---|---|
| 9,596,175 | B2* | 3/2017 | Deshpande | H04L 45/60 |
| 9,880,829 | B2* | 1/2018 | Katiyar | G06F 8/65 |
| 10,505,868 | B2* | 12/2019 | Mackie | H04L 41/122 |
| 10,536,375 | B2* | 1/2020 | Nimmagadda | H04L 45/74 |
| 10,725,883 | B2* | 7/2020 | Ganesan | G06F 11/3055 |
| 10,979,339 | B2* | 4/2021 | Kananda | H04L 45/02 |
| 11,647,389 | B2* | 5/2023 | Rios, III | H04W 12/08 726/1 |
| 2016/0087876 | A1* | 3/2016 | Fan | H04L 67/60 709/242 |
| 2021/0385161 | A1* | 12/2021 | Ghosh | H04L 45/64 |

* cited by examiner

*Primary Examiner* — Alex Tran
(74) *Attorney, Agent, or Firm* — Harrity & Harrity, LLP (57) ABSTRACT

In some implementations, a network device may cause instantiation of a base container associated with a line card of the network device. The network device may cause, based on causing the instantiation of the base container, instantiation of a module container associated with a physical interface module of the line card of the network device. The network device may manage, using the base container, a forwarding table associated with the line card. The network device may manage, using the module container, one or more physical components of the physical interface module.

20 Claims, 10 Drawing Sheets

ENABLING ONLINE INSERTION AND REMOVAL OF A PHYSICAL INTERFACE MODULE OF A LINE CARD OF A NETWORK DEVICE

BACKGROUND

Online insertion and removal (OIR) is a feature that enables a module to be installed in, or removed from, a network device while the network device is operating.

SUMMARY

In some implementations, a method includes causing, by a network device, instantiation of a base container associated with a line card of the network device; causing, by the network device and based on causing the instantiation of the base container, instantiation of a module container associated with a physical interface module of the line card of the network device; managing, by the network device and using the base container, a forwarding table associated with the line card; and managing, by the network device and using the module container, one or more physical components of the physical interface module.

In some implementations, a non-transitory computer-readable medium storing a set of instructions includes one or more instructions that, when executed by one or more processors of a network device, cause the network device to: identify that a base container is instantiated, wherein the base container is associated with a line card of the network device; identify, based on identifying that the base container is instantiated, that a physical interface module is available in association with the line card; cause, based on identifying that the physical interface module is available, instantiation of a module container associated with the physical interface module; manage, using the base container, a forwarding table associated with the line card; and manage, using the module container, one or more physical components of the physical interface module.

In some implementations, a network device includes one or more memories; and one or more processors to: identify a base container of the network device that is associated with a line card of the network device; identify a module container of the network device that is associated with a physical interface module of the line card; manage, using the base container, a forwarding table associated with the line card; and manage, using the module container, one or more physical components of the physical interface module.

DETAILED DESCRIPTION

The following detailed description of example implementations refers to the accompanying drawings. The same reference numbers in different drawings may identify the same or similar elements.

A line card (e.g., a flexible physical interface card concentrator (FPC), a logical FPC, and/or another type of line card) of a network device can support one or more physical interface modules (e.g., one or more physical interface cards (PICs); one or more module interface cards (MICs), such as one or more line module interface cards (LMICs); and/or one or more other physical interface modules). In many cases, the network device maintains a separate forwarding table for each physical interface module that is included in the line card. Thus, when the line card includes multiple physical interface modules, the network device needs to consume computing resources (e.g., processing resources, memory resources, communication resources, and/or power resources, among other examples) of the network device to synchronize the forwarding tables associated with the respective physical interface modules. Further, adding or removing a physical interface module while the network device is operating, such as part of an OIR process, requires dynamically adding or removing a forwarding table while also maintaining a synchronization between the forwarding tables. Consequently, due to this complexity, such a process is prone to error, which can cause the network device to crash and/or behave in an unexpected manner. Thus, in many cases, an OIR process is not practically available for physical interface modules with respect to a line card of a network device.

Some implementations described herein include a network device. The network device identifies that a line card is available to the network device and thereby causes instantiation of a base container associated with the line card (e.g., within the line card). For each physical interface module that is included in the line card, the network device identifies that the physical interface module is available to the network device in association with the line card and thereby causes instantiation of a module container associated with the physical interface module (e.g., within the line card). The network device, using the base container, manages a forwarding table associated with the line card (e.g., for any number of physical interface modules associated with the line card). The network device, using respective module containers, manages one or more physical components of the physical interface modules of the line card (e.g., to facilitate routing of traffic by the physical interface modules). In this way, a distributed, container-based implementation may be used to facilitate routing of traffic by the line card and any number of physical interface modules included in the line card.

Accordingly, some implementations described herein enable OIR of a physical interface module in the line card of the network device. For example, the network device (e.g., using the base container) may manage a single forwarding table that can be utilized by the line card and any physical interface module of the line card (rather than individual forwarding tables for each physical interface module). Accordingly, when a physical interface module is added or removed from the line card, the network device (e.g., using the base container) continues to manage the forwarding table. Each module container (e.g., that is associated with an available physical interface module of the line card) can communicate with the base container to obtain forwarding information from the forwarding table that can be used to facilitate forwarding of traffic received by the module container.

Thus, the network device does not need to consume computing resources (e.g., processing resources, memory resources, communication resources, and/or power resources, among other examples) of the network device to synchronize multiple forwarding tables associated with the respective physical interface modules. Additionally, because only a single forwarding table is maintained, only single copies of the routes, next hops, and/or other forwarding information needs to be included in the forwarding table, which allows for improved packet forwarding engine (PFE) scaling and performance (e.g., because more information is maintained than in multiple forwarding tables, and only one forwarding table needs to be accessed to obtain forwarding information that can be used to facilitate forwarding of traffic).

Further, adding or removing a physical interface module while the network device is operating, such as part of an OIR process, only requires instantiation or termination of a module container (and therefore is less complex than dynamically adding or removing a forwarding table while also maintaining a synchronization between forwarding tables). Accordingly, performing an OIR process is less error prone, and therefore the network device is less likely to crash and/or behave in an unexpected manner.

Notably, because a base container and one or more module containers are instantiated in the line card of the network device, the line card and the one or more physical interface modules of the line card can be represented in the network device without modification to any configuration parameters of the network device. For example, interface identifiers and/or mappings of the line card and the one or more physical interface modules may remain the same, and/or a user (e.g., a network administrator) may access and control the line card and the one or more physical interface modules (e.g., to cause the line card and/or one or more physical interface modules to go offline, to come online, and/or to restart, among other examples) via a command line interface (CLI). Additionally, the one or more physical interface modules may be different (e.g., have different types of application-specific integrated circuits (ASICs)), because the network device can instantiate a container for each physical interface module that is specifically configured to maintain a physical component of that physical interface module. This allows for the line card and network device to provide a different capability and performance than is otherwise available.

FIGS. 1A-1F are diagrams of an example implementation 100 associated with enabling online insertion and removal of a physical interface module of a line card of a network device. As shown in FIGS. 1A-1F, example implementation 100 includes a network device, which is described in more detail below in connection with FIGS. 2-4.

As shown in FIGS. 1A-1F, the network device may have a routing engine and a line card. The routing engine may include computing resources that are allocated to routing traffic (e.g., receiving and forwarding traffic). The line card may be an FPC, a logical FPC, and/or another type of line card that is associated with the network device. The line card may include its own computing resources and may include, as shown in FIGS. 1A-1F, a kernel and an operating system (OS), which may manage and/or mediate access to the computing resources of the line card.

Figure 1A:
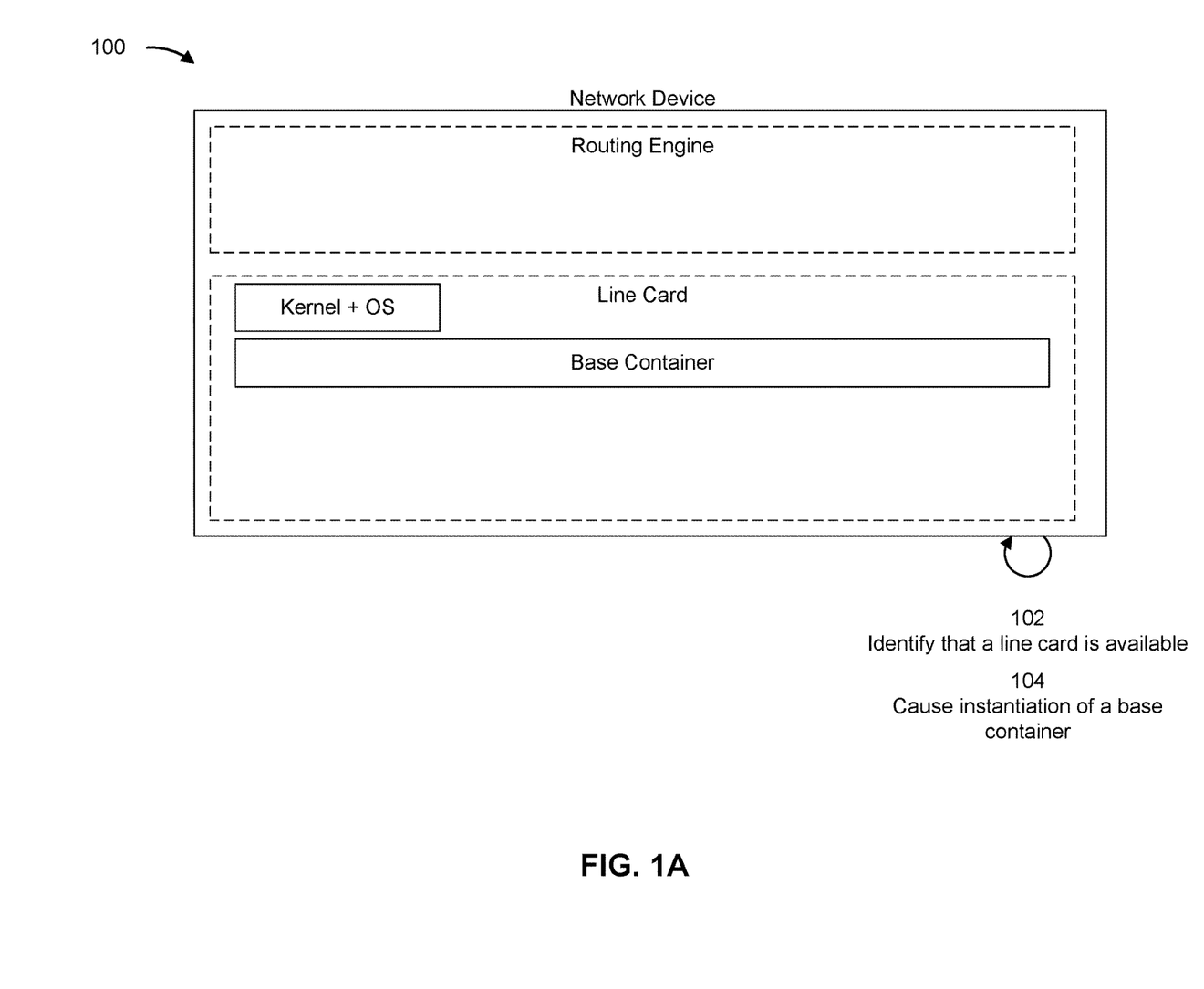
FIGS. 1A-1F are diagrams of an example implementation associated with enabling OIR of a physical interface module of a line card of a network device.

As shown in FIG. 1A, and by reference number 102, the network device may identify that the line card is available (e.g., to the network device). That is, the network device may identify that the line card is enabled (e.g., powered on, booted up, and/or otherwise able to facilitate connection of the network device to a network). Accordingly, as shown by reference number 104, the network device may cause (e.g., based on identifying that the line card is available) instantiation of a base container (e.g., within the line card). The base container may include, for example, one or more daemons associated with physical and/or logical management of the line card (and one or more physical interface modules, as described herein). The network device may use computing resources associated with the line card (and/or the kernel and OS of the line card) to identify that the line card is available and/or to cause instantiation of the base container.

Figure 1B:
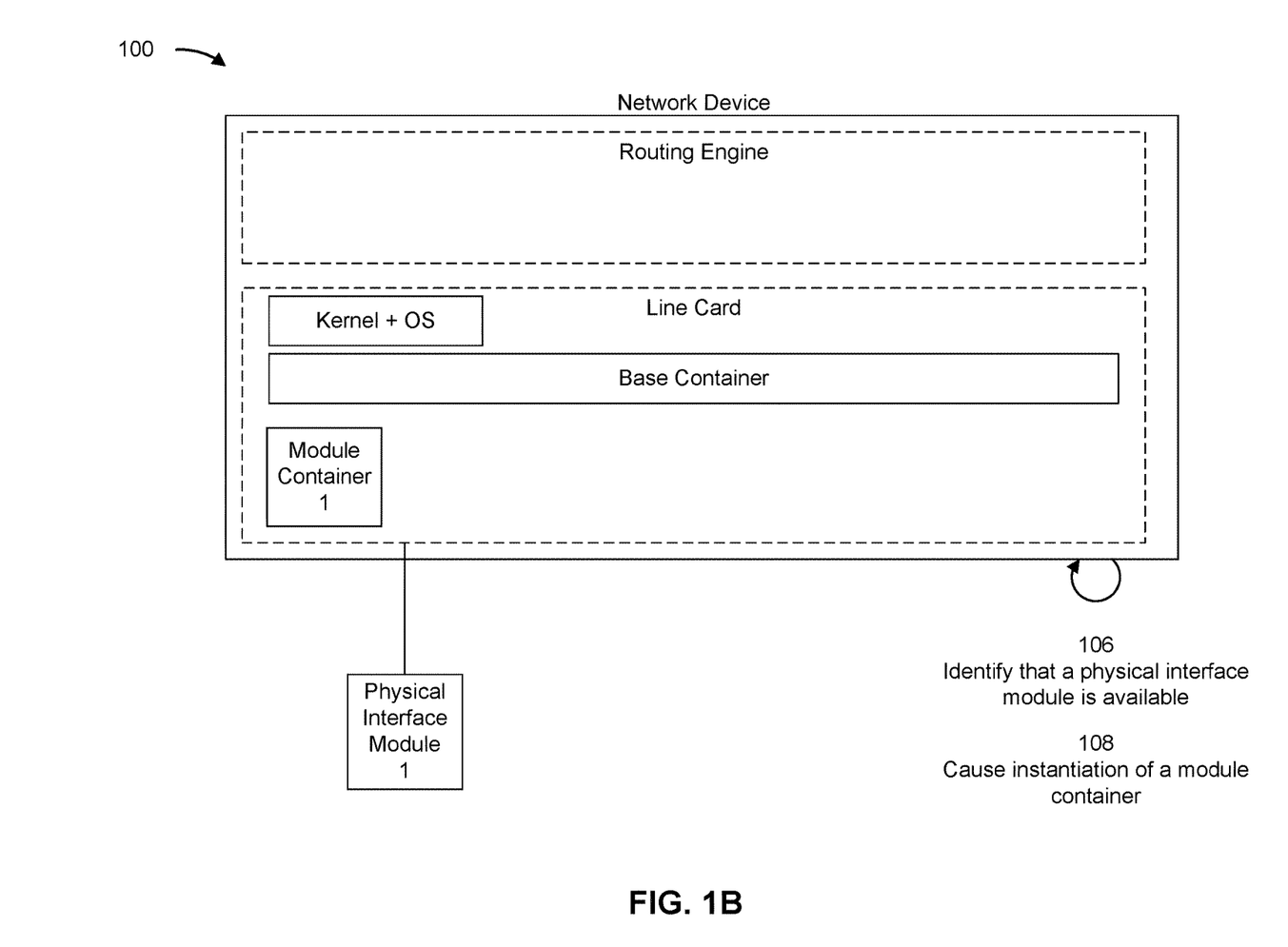

As shown in FIG. 1B, and by reference number 106, the network device may identify that a physical interface module (e.g., shown as physical interface module 1) is available in association with the line card (e.g., available to the network device via the line card). That is, the network device may identify that the physical interface module is inserted into the line card (e.g., connected to a slot, port, and/or other interface of the line card) and/or that the physical interface module is enabled within the line card (e.g., powered on, booted up, and/or otherwise able to facilitate connection of the network device to the network). Accordingly, as shown by reference number 108, the network device may cause (e.g., based on identifying that the physical interface module is available) instantiation of a module container (e.g., within the line card). The module container (e.g., shown as module container 1) may include, for example, one or more daemons associated with physical management and functioning of the physical interface module. The network device may use computing resources associated with the line card (and/or the kernel and OS of the line card) to identify that the physical interface module is available and/or to cause instantiation of the module container. In some implementations, the network device may use the base container to identify that the physical interface module is available and/or to cause instantiation of the module container.

Figure 1C:
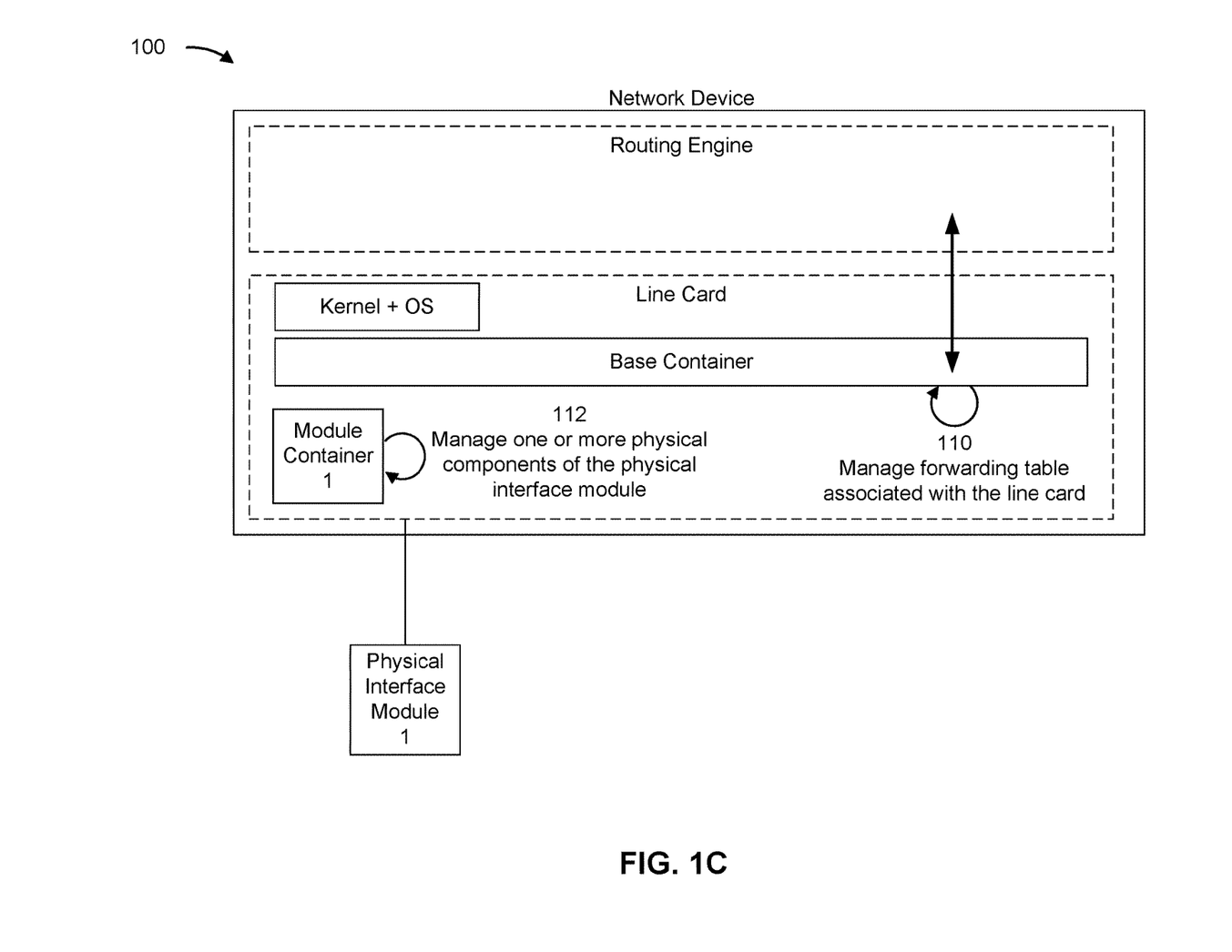

As shown in FIG. 1C, and by reference number 110, the network device (e.g., using the base container) may manage a forwarding table associated with the line card. The forwarding table may be a forwarding information base (FIB), a forwarding context, and/or a similar data structure. The forwarding table may include, for example, information related to one or more routes for traffic that is to be routed by the network device using the line card (and the physical interface module and/or any other physical interface modules that are to be associated with the line card). Managing the forwarding table may include, for example, communicating with the routing engine of the network device to obtain route information, and updating the forwarding table based on the route information. In this way, the network device (e.g., using the base container) may manage a single forwarding table that can be utilized by the line card and any physical interface module of the line card (rather than individual forwarding tables for each physical interface module).

As shown by reference number 112, the network device (e.g., using the module container) may manage one or more physical components of the physical interface module. The one or more physical components may include, for example, one or more physical interfaces of the physical interface module, at least one ASIC of the physical interface module, one or more board components of the physical interface module, and/or one or more other physical components of the physical interface module. Managing the one or more physical components may include facilitating routing of traffic by the physical interface module, as described herein.

Figure 1D:
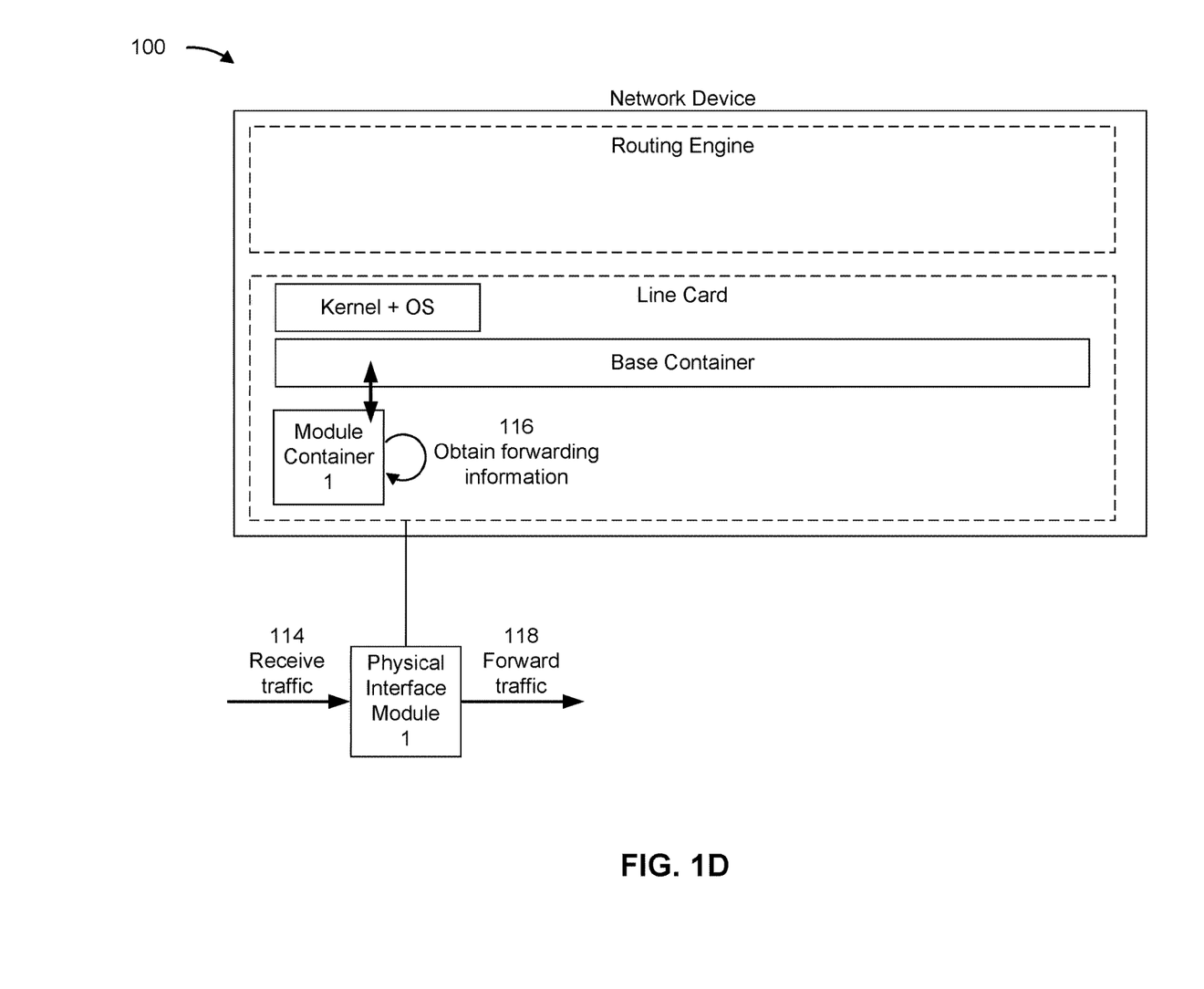

As shown in FIG. 1D, and by reference number 114, the network device may receive traffic via the physical interface module of the line card. Accordingly, as shown by reference number 116, the network device (e.g., using the module container and based on the traffic) may obtain forwarding information from the forwarding table associated with the line card. For example, the network device (e.g., using the module container) may identify address information associated with the traffic (e.g., in a header associated with the traffic), may provide the address information to the base container and the network device (e.g., using the base container), and/or may search the forwarding table based on the address information to identify the forwarding information (e.g., that indicates how the traffic is to be forwarded). The network device (e.g., using the base container) then may provide the forwarding information to the module container. As shown by reference number 118, the network device (e.g., using the module) may forward the traffic (e.g., based on the forwarding information) via the physical interface module. In this way, the module container is able to communicate with the base container (e.g., within the line card) to allow the module container to obtain forwarding information to facilitate forwarding of traffic by the physical interface module.

Figure 1E:
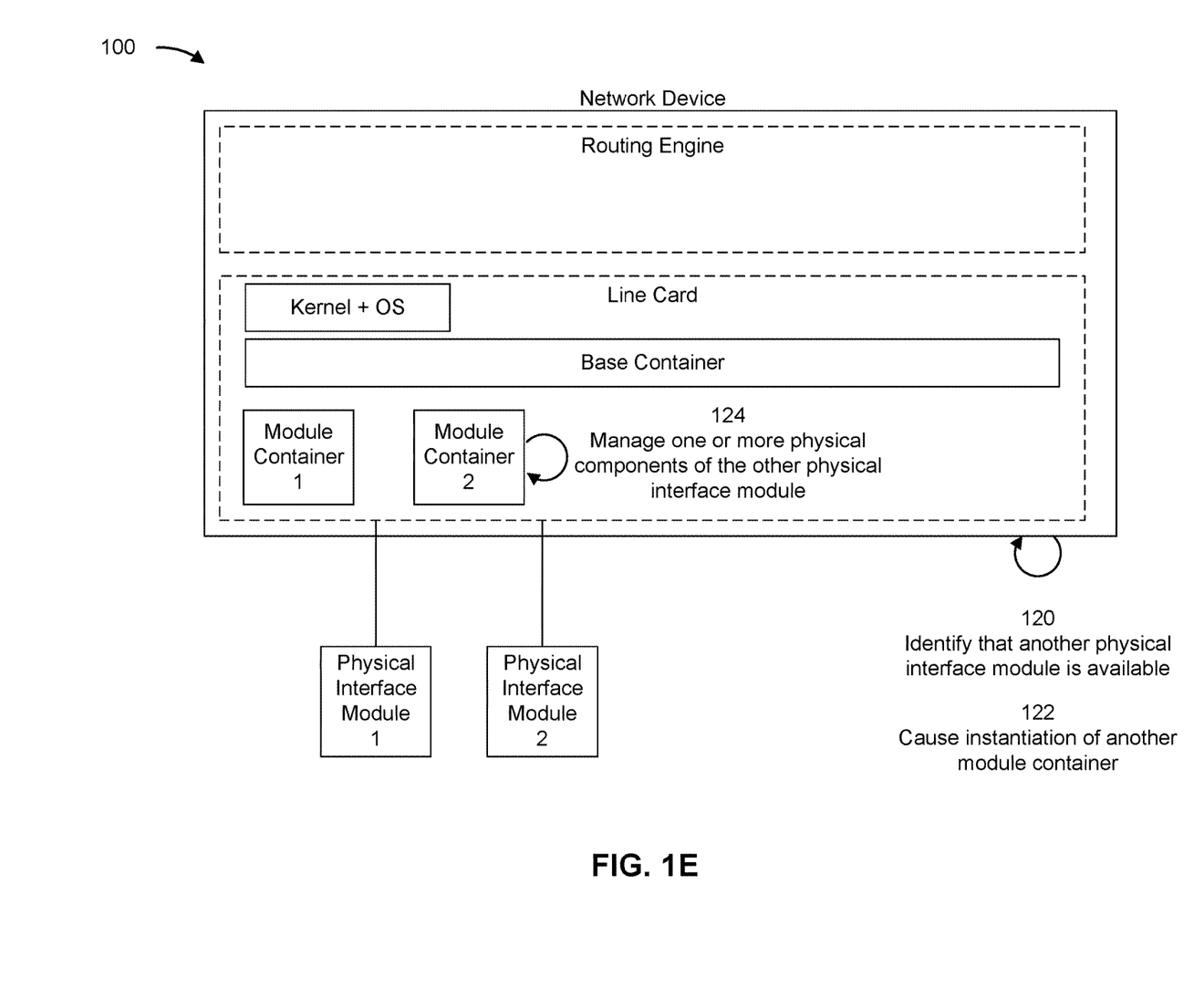

As shown in FIG. 1E, and by reference number 120, the network device may identify that another physical interface module (e.g., shown as physical interface module 2) is available in association with the line card (e.g., available to the network device via the line card). That is, the network device may identify that the other physical interface module is inserted into the line card (e.g., connected to a slot, port, and/or other interface of the line card) and/or that the other physical interface module is enabled within the line card (e.g., powered on, booted up, and/or otherwise able to facilitate connection of the network device to the network). Accordingly, as shown by reference number 122, the network device may cause (e.g., based on identifying that the physical interface module is available) instantiation of another module container (e.g., within the line card). The other module container (e.g., shown as module container 2) may include, for example, one or more daemons associated with physical management and functioning of the other physical interface module. The network device may use computing resources associated with the line card (and/or the kernel and OS of the line card) to identify that the other physical interface module is available and/or to cause instantiation of the other module container. In some implementations, the network device may use the base container to identify that the other physical interface module is available and/or to cause instantiation of the other module container.

As shown by reference number 124, the network device (e.g., using the other module container) may manage one or more physical components of the other physical interface module. The one or more physical components may include, for example, one or more physical interfaces of the other physical interface module, at least one ASIC of the other physical interface module, one or more board components of the other physical interface module, and/or one or more other physical components of the other physical interface module. Managing the one or more other physical components may include facilitating routing of traffic by the other physical interface module, in a similar manner as described herein in relation to FIG. 1D.

In some implementations, the network device may receive first traffic via the physical interface module (e.g., the physical interface module 1) of the line card. Accordingly, the network device, using the module container (e.g., the module container 1) and based on the first traffic, may obtain first forwarding information from the forwarding table associated with the line card (e.g., in a similar manner as that described herein in relation to FIG. 1D). The network device (e.g., using the module container) then may forward the traffic (e.g., based on the first forwarding information) via the physical interface module. Additionally, the network device may receive second traffic via the other physical interface module (e.g., the physical interface module 2) of the line card. Accordingly, the network device, using the other module container (e.g., the module container 2) and based on the second traffic, may obtain second forwarding information from the forwarding table associated with the line card (e.g., in a similar manner as that described herein in relation to FIG. 1D). The network device (e.g., using the other module container) then may forward the second traffic (e.g., based on the second forwarding information) via the other physical interface module. In this way, the module container and the other module are each able to communicate (e.g., independently communicate) with the base container (e.g., within the line card) to obtain respective forwarding information from the forwarding table. Accordingly, respective forwarding tables are not needed for the physical interface module and the other physical interface module.

Figure 1F:
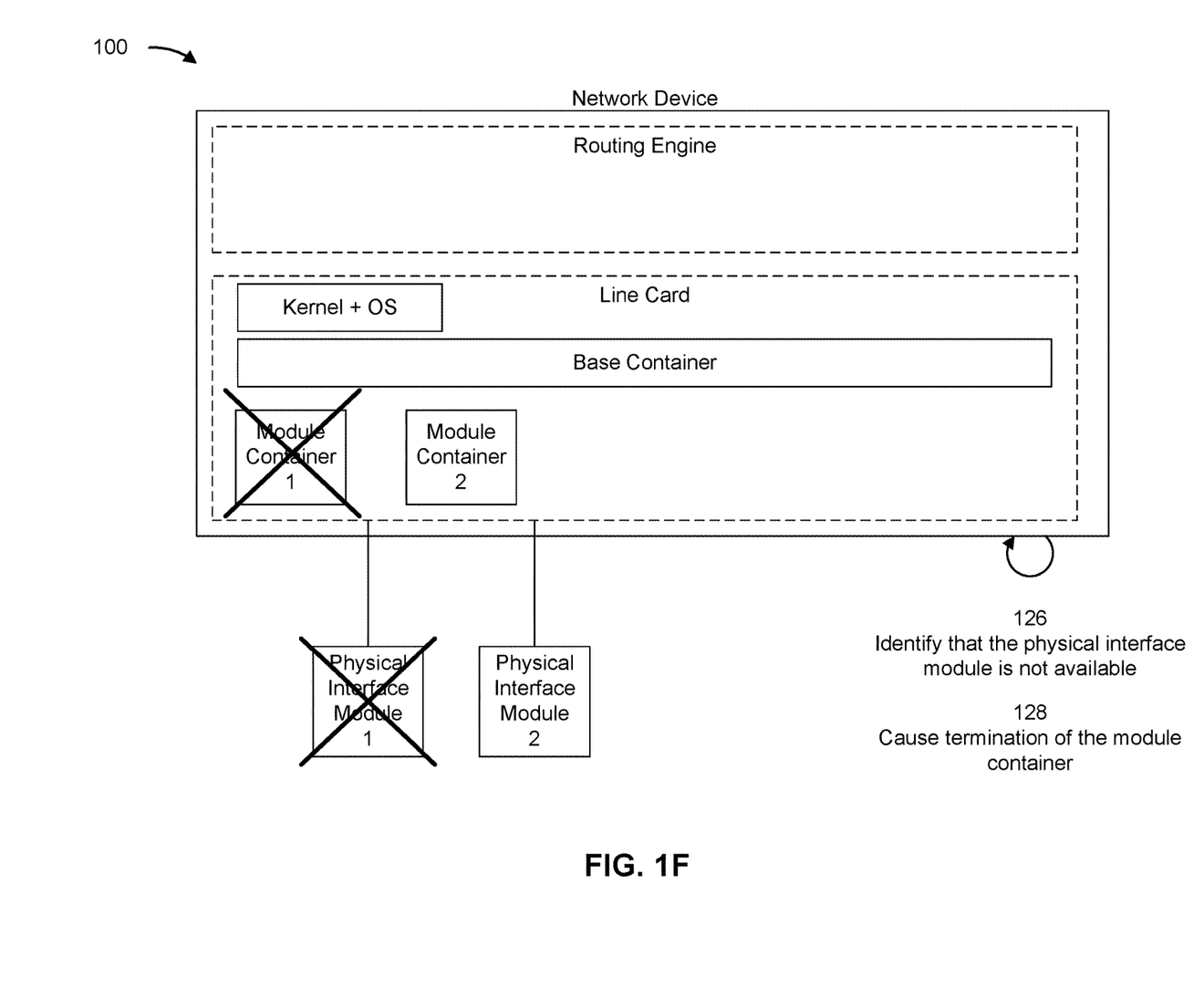

As shown in FIG. 1F, and by reference number 126, the network device may identify that the physical interface module (e.g., physical interface module 1) is not available in association with the line card (e.g., is not available to the network device via the line card). That is, the network device may identify that the physical interface module is not inserted (or no longer inserted) into the line card (e.g., not connected to a slot, port, and/or other interface of the line card) and/or that the physical interface module is not enabled within the line card (e.g., not powered on, not booted up, and/or otherwise not able to facilitate connection of the network device to the network). Accordingly, as shown by reference number 128, the network device may cause (e.g., based on identifying that the physical interface module is not available) termination of the module container (e.g., the module container 1, in the line card). The network device may use computing resources associated with the line card (and/or the kernel and OS of the line card) to identify that the physical interface module is not available and/or to cause termination of the module container. In some implementations, the network device may use the base container to identify that the physical interface module is not available and/or to cause termination of the module container.

Accordingly, after termination of the module container, the network device (e.g., using the base container) may continue to manage the forwarding table associated with the line card (e.g., as described herein in relation to FIG. 1B). Additionally, or alternatively, the network device (e.g., using the other module container) may receive and forward traffic via the other physical interface module (e.g., the physical interface module 2), such as in a similar manner as that described herein in relation to FIG. 1D.

In some implementations, after termination of the module container, the network device may identify that the physical interface module is available again in association with the line card (e.g., available again to the network device via the line card). That is, the network device may identify that the physical interface module is inserted again into the line card and/or that the physical interface module is enabled again within the line card. Accordingly, the network device may cause (e.g., based on identifying that the physical interface module is available again) instantiation of a new module container (e.g., within the line card). The new module container is different than the module container that was terminated (e.g., is not a re-instantiation of the terminated module container), but may include one or more daemons associated with physical management and functioning of the physical interface module. The network device may use computing resources associated with the line card (and/or the kernel and OS of the line card) to identify that the physical interface module is available again and/or to cause instantiation of the new module container. In some implementations, the network device may use the base container to identify that the physical interface module is available again and/or to cause instantiation of the new module container. The network device (e.g., using the new module container) then may manage one or more physical components of the physical interface module.

As indicated above, FIGS. 1A-1F are provided as an example. Other examples may differ from what is described with regard to FIGS. 1A-1F.

Figure 2:
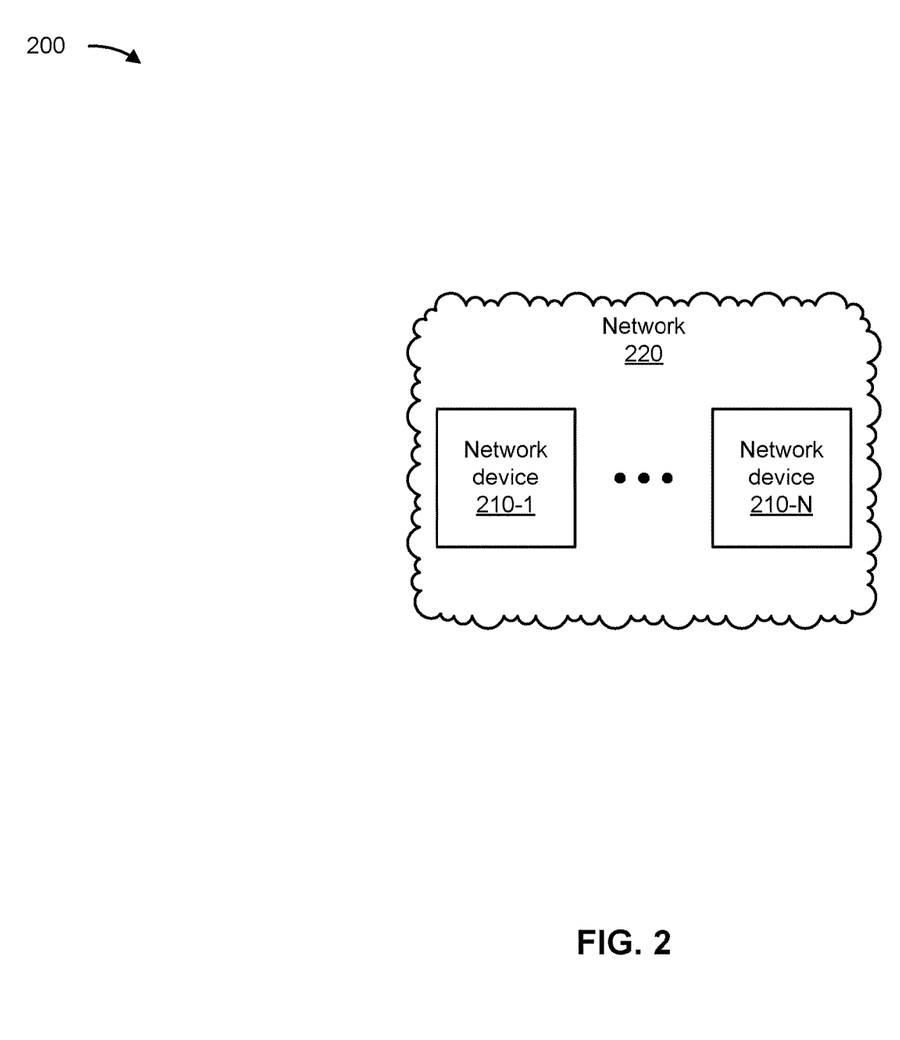
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more network devices 210 (shown as network device 210-1 through network device 210-N) and a network 220. Devices of environment 200 may interconnect via wired connections, wireless connections, or a combination of wired and wireless connections.

Network device 210 includes one or more devices capable of receiving, processing, storing, routing, and/or providing traffic, such as in a manner described herein. For example, network device 210 may include a router, such as a label switching router (LSR), a label edge router (LER), an ingress router, an egress router, a provider router (e.g., a provider edge router or a provider core router), a virtual router, or another type of router. Additionally, or alternatively, network device 210 may include a gateway, a switch, a firewall, a hub, a bridge, a reverse proxy, a server (e.g., a proxy server, a cloud server, or a data center server), a load balancer, and/or a similar device. In some implementations, network device 210 may be a physical device implemented within a housing, such as a chassis. In some implementations, network device 210 may be a virtual device implemented by one or more computer devices of a cloud computing environment or a data center. In some implementations, a group of network devices 210 may be a group of data center nodes that are used to route traffic flow through network 220. In some implementations, network device 210 may include a line card and one or more physical interface modules.

Network 220 includes one or more wired and/or wireless networks. For example, network 220 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
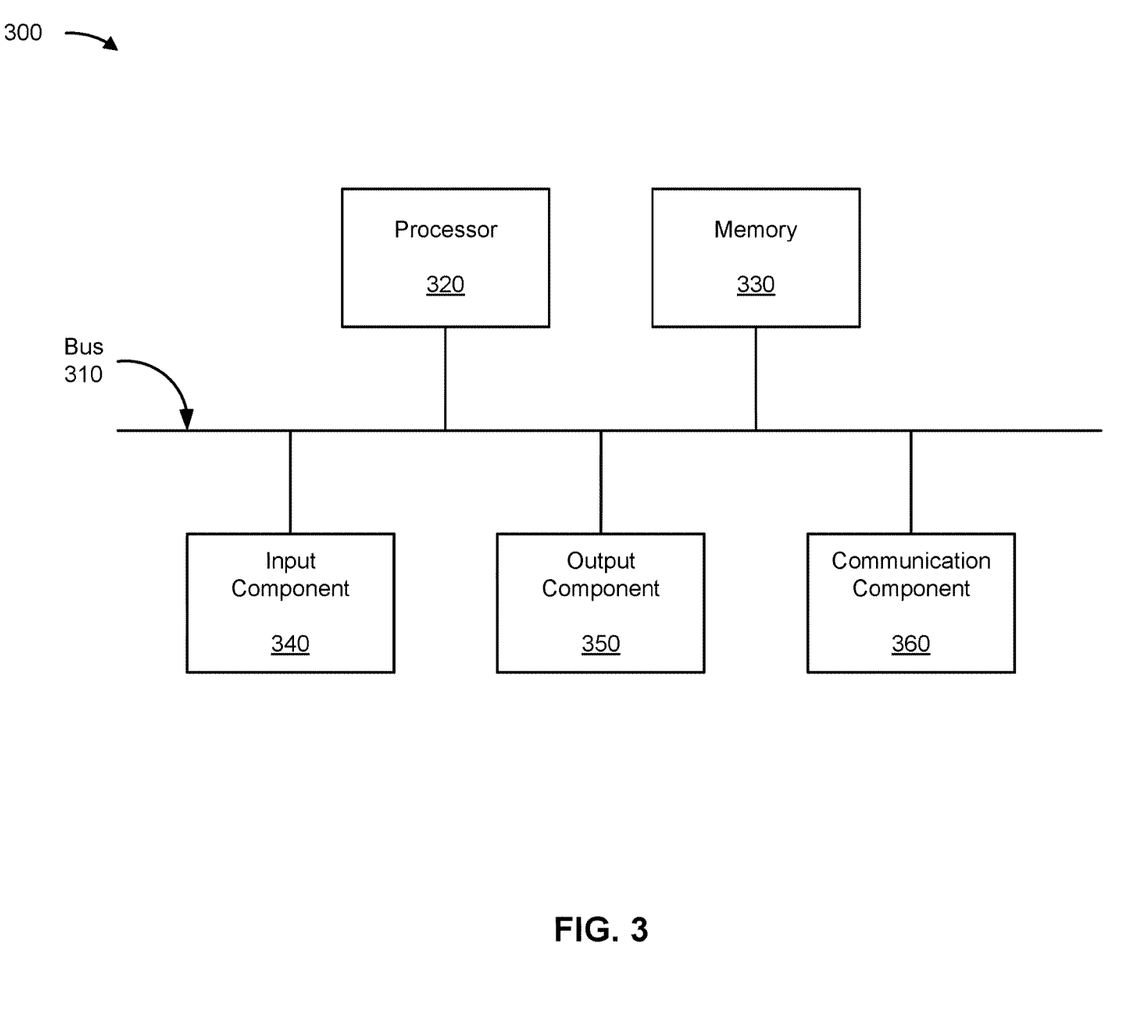
FIG. 3 is a diagram of example components of a device associated with enabling OIR of a physical interface module of a line card of a network device.

FIG. 3 is a diagram of example components of a device 300 associated with enabling OIR of a physical interface module of a line card of a network device. The device 300 may correspond to network device 210. In some implementations, network device 210 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
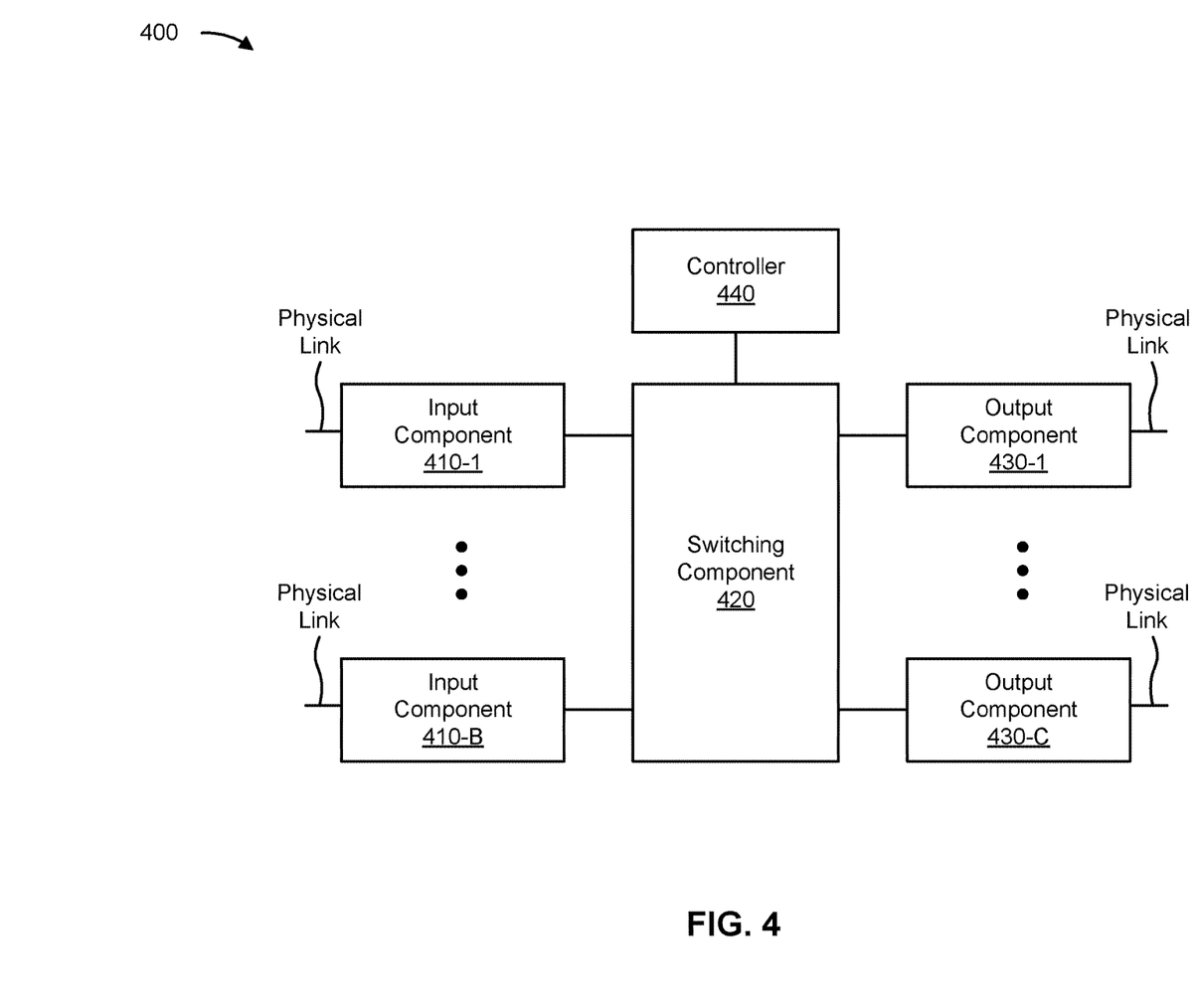
FIG. 4 is a diagram of example components of a device associated with enabling OIR of a physical interface module of a line card of a network device.

FIG. 4 is a diagram of example components of a device 400 associated with enabling OIR of a physical interface module of a line card of a network device. Device 400 may correspond to network device 210. In some implementations, network device 210 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
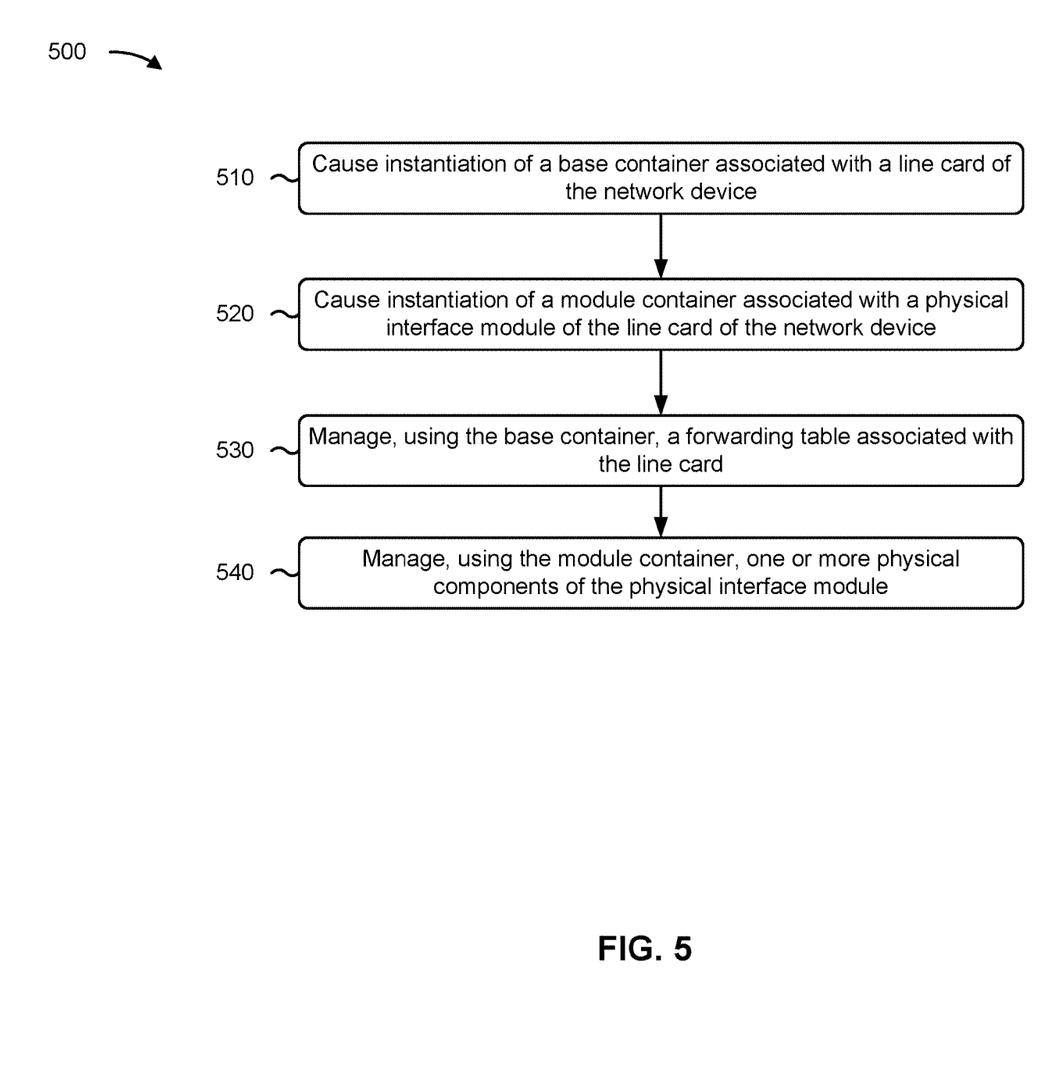
FIG. 5 is a flowchart of an example process associated with enabling OIR of a physical interface module of a line card of a network device.

FIG. 5 is a flowchart of an example process 500 associated with enabling OIR of a physical interface module of a line card of a network device. In some implementations, one or more process blocks of FIG. 5 are performed by a network device (e.g., network device 210). In some implementations, one or more process blocks of FIG. 5 are performed by another device or a group of devices separate from or including the network device, such as another network device. Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output components 430, and/or controller 440; and/or one or more other components.

As shown in FIG. 5, process 500 may include causing instantiation of a base container associated with a line card of the network device (block 510). For example, the network device may cause instantiation of a base container associated with a line card of the network device, as described above.

As further shown in FIG. 5, process 500 may include causing instantiation of a module container associated with a physical interface module of the line card of the network device (block 520). For example, the network device may cause, based on causing the instantiation of the base container, instantiation of a module container associated with a physical interface module of the line card of the network device, as described above.

As further shown in FIG. 5, process 500 may include managing, using the base container, a forwarding table associated with the line card (block 530). For example, the network device may manage, using the base container, a forwarding table associated with the line card, as described above.

As further shown in FIG. 5, process 500 may include managing, using the module container, one or more physical components of the physical interface module (block 540). For example, the network device may manage, using the module container, one or more physical components of the physical interface module, as described above.

Process 500 may include additional implementations, such as any single implementation or any combination of implementations described below and/or in connection with one or more other processes described elsewhere herein.

In a first implementation, causing the instantiation of the base container comprises identifying that the line card is available, and causing, based on identifying that the line card is available, the instantiation of the base container.

In a second implementation, alone or in combination with the first implementation, process 500 includes identifying, based on managing the forwarding table using the base container, that the line card is not available, and causing, based on identifying that the line card is not available, termination of the base container and termination of the module container.

In a third implementation, alone or in combination with one or more of the first and second implementations, causing the instantiation of the module container comprises identifying that the physical interface module is available in association with the line card, and causing, based on identifying that the physical interface module is available, the instantiation of the module container.

In a fourth implementation, alone or in combination with one or more of the first through third implementations, process 500 includes identifying, based on managing the one or more physical components of the physical interface module using the module container, that the physical interface module is not available in association with the line card, and causing, based on identifying that the physical interface module is not available in association with the line card, termination of the module container.

In a fifth implementation, alone or in combination with one or more of the first through fourth implementations, managing the forwarding table associated with the line card comprises communicating, using the base container, with a routing engine of the network device to obtain route information, and updating, using the base container, the forwarding table associated with the line card and based on the route information.

In a sixth implementation, alone or in combination with one or more of the first through fifth implementations, process 500 includes receiving, via the physical interface module, traffic; obtaining, using the module container and based on the traffic, forwarding information from the forwarding table associated with the line card; and forwarding, via the physical interface module and using the module container, the traffic based on the forwarding information.

In a seventh implementation, alone or in combination with one or more of the first through sixth implementations, process 500 includes causing, by the network device and based on causing the instantiation of the base container and causing the instantiation of the module container, instantiation of another module container associated with another physical interface module of the line card of the network device, and managing, by the network device and using the other module container, one or more physical components of the other physical interface module.

In an eighth implementation, alone or in combination with one or more of the first through seventh implementations, process 500 includes receiving, via the physical interface module, first traffic; obtaining, using the module container and based on the first traffic, first forwarding information from the forwarding table associated with the line card; forwarding, via the physical interface module and using the module container, the first traffic based on the first forwarding information; receiving, via the other physical interface module, second traffic; obtaining, using the other module container and based on the second traffic, second forwarding information from the forwarding table associated with the line card; and forwarding, via the other physical interface module and using the other module container, the second traffic based on the second forwarding information.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   causing, by a network device, instantiation of a base container within a line card of the network device based on identifying that the line card is enabled;
   causing, by the network device and based on causing the instantiation of the base container within the line card, instantiation of a module container associated with a physical interface module of the line card of the network device based on identifying that the physical interface module is enabled within the line card;
   managing, by the network device and using the base container, a forwarding table associated with the line card; and
   managing, by the network device and using the module container, one or more physical components of the physical interface module.

2. The method of claim 1, wherein the module container is instantiated within the line card.

3. The method of claim 1, further comprising:
   identifying, based on managing the one or more physical components of the physical interface module using the module container, that the physical interface module is not available in association with the line card; and
   causing, based on identifying that the physical interface module is not available in association with the line card, termination of the module container.

4. The method of claim 1, wherein managing the forwarding table associated with the line card comprises:
   communicating, using the base container, with a routing engine of the network device to obtain route information; and
   updating, using the base container, the forwarding table associated with the line card and based on the route information.

5. The method of claim 1, further comprising:
   receiving, via the physical interface module, traffic;
   obtaining, using the module container and based on the traffic, forwarding information from the forwarding table associated with the line card; and
   forwarding, via the physical interface module and using the module container, the traffic based on the forwarding information.

6. The method of claim 1, further comprising:
   causing, by the network device and based on causing the instantiation of the base container and causing the instantiation of the module container, instantiation of another module container associated with another physical interface module of the line card of the network device; and
   managing, by the network device and using the other module container, one or more physical components of the other physical interface module.

7. The method of claim 6, further comprising:
   receiving, via the physical interface module, first traffic;
   obtaining, using the module container and based on the first traffic, first forwarding information from the forwarding table associated with the line card;
   forwarding, via the physical interface module and using the module container, the first traffic based on the first forwarding information;
   receiving, via the other physical interface module, second traffic;
   obtaining, using the other module container and based on the second traffic, second forwarding information from the forwarding table associated with the line card; and
   forwarding, via the other physical interface module and using the other module container, the second traffic based on the second forwarding information.

8. The method of claim 1, wherein identifying that the line card is enabled is based on identifying that the line card is powered on.

9. The method of claim 1, wherein identifying that the line card is enabled is based on identifying that the line card is able to facilitate connection of the network device to a network.

10. A non-transitory computer-readable medium storing a set of instructions, the set of instructions comprising:
one or more instructions that, when executed by one or more processors of a network device, cause the network device to:
cause, based on identifying that a line card of the network device is enabled, instantiation of a base container; within the line card;
identify, based on identifying that the base container is instantiated, that a physical interface module is enabled within the line card;
cause, based on identifying that the physical interface module is enabled within the line card, instantiation of a module container associated with the physical interface module;
manage, using the base container, a forwarding table associated with the line card; and
manage, using the module container, one or more physical components of the physical interface module.

11. The non-transitory computer-readable medium of claim 10, wherein the module container is instantiated within the line card.

12. The non-transitory computer-readable medium of claim 10, wherein the one or more instructions further cause the network device to:
identify, based on managing the one or more physical components of the physical interface module using the module container, that the physical interface module is not available in association with the line card; and
cause, based on identifying that the physical interface module is not available in association with the line card, termination of the module container.

13. The non-transitory computer-readable medium of claim 12, wherein the one or more instructions further cause the network device to:
identify, based on causing the termination of the module container, that the physical interface module is available again in association with the line card; and
cause, based on identifying that the physical interface module is available again, instantiation of another module container associated with the physical interface module.

14. The non-transitory computer-readable medium of claim 13, wherein the one or more instructions further cause the network device to:
manage, using the other module container, the one or more physical components of the physical interface module.

15. The non-transitory computer-readable medium of claim 10, wherein the one or more instructions further cause the network device to:
receive, via the physical interface module, traffic;
obtain, using the module container and based on the traffic, forwarding information from the forwarding table associated with the line card; and
forward, via the physical interface module and using the module container, the traffic based on the forwarding information.

16. The non-transitory computer-readable medium of claim 10, wherein the one or more instructions further cause the network device to:
identify that another physical interface module is available in association with the line card; and
cause, based on identifying that the other physical interface module is available in association with the line card, instantiation of another module container associated with the other physical interface module; and
manage, using the other module container, one or more physical components of the other physical interface module.

17. A network device, comprising:
one or more memories; and
one or more processors to:
identify a base container of the network device that is associated with a line card of the network device,
wherein the base container is instantiated within the line card based on identifying that the line card is enabled;
identify a module container of the network device that is associated with a physical interface module of the line card, wherein the module container is instantiated based on
identifying that the physical interface module is enabled within the line card;
manage, using the base container, a forwarding table associated with the line card; and
manage, using the module container, one or more physical components of the physical interface module.

18. The network device of claim 17, wherein the module container is instantiated within the line card.

19. The network device of claim 17, wherein the one or more processors are further to:
identify, based on managing the one or more physical components of the physical interface module using the module container, that the physical interface module is not available in association with the line card; and
cause, based on identifying that the physical interface module is not available in association with the line card, termination of the module container.

20. The network device of claim 17, wherein the one or more processors are further to:
cause instantiation of another module container associated with another physical interface module of the line card; and
manage, using the other module container, one or more physical components of the other physical interface module.

* * * * *